United States Patent
Yoshida

(10) Patent No.: US 8,366,228 B2
(45) Date of Patent: Feb. 5, 2013

(54) PRINT CONTROLLER FOR CONTROLLING INK JET PRINTER

(75) Inventor: Yasunari Yoshida, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 502 days.

(21) Appl. No.: 12/633,450

(22) Filed: Dec. 8, 2009

(65) Prior Publication Data

US 2010/0165032 A1 Jul. 1, 2010

(30) Foreign Application Priority Data

Dec. 25, 2008 (JP) ................................ 2008-330935

(51) Int. Cl.
*B41J 2/205* (2006.01)
(52) U.S. Cl. .................................. 347/15; 347/9; 347/5
(58) Field of Classification Search .................... 347/15, 347/19, 14, 5.9
See application file for complete search history.

(56) References Cited

U.S. PATENT DOCUMENTS

| 2003/0193533 A1* | 10/2003 | Kikuta et al. | 347/5 |
| 2004/0100513 A1* | 5/2004 | Kanematsu | 347/9 |
| 2007/0247678 A1 | 10/2007 | Takahashi et al. | |
| 2010/0245416 A1 | 9/2010 | Ohshima et al. | |

FOREIGN PATENT DOCUMENTS

| JP | H07-047695 A | 2/1995 |
| JP | 2001-038888 A | 2/2001 |
| JP | 2006-243858 A | 9/2006 |
| JP | 2007-158688 A | 6/2007 |
| JP | 2007-261036 A | 10/2007 |
| JP | 2007-261037 A | 10/2007 |
| JP | 2007-288733 A | 11/2007 |
| JP | 2008-219418 A | 9/2008 |
| JP | 2008-260279 A | 10/2008 |
| JP | 2008-284774 A | 11/2008 |

OTHER PUBLICATIONS

Japan Patent Office; Office Action for Patent Application No. JP2008-330935, mailed Jan. 11, 2011.

* cited by examiner

*Primary Examiner* — Manish S Shah
(74) *Attorney, Agent, or Firm* — Baker Botts L.L.P.

(57) ABSTRACT

A print controller is provided for generating dot data, which specifies a dot formation state and which is to be provided to a printing unit. The printing unit is configured to execute, based on the dot data, dot-forming operations to form dots in dot rows extending in a prescribed direction by moving a print head in the prescribed direction while ejecting ink droplets from nozzles in the print head and to print an image by repeatedly executing the dot-forming operation to form a plurality of dot rows juxtaposed in a direction orthogonal to the prescribed direction. The print controller includes: a printing width determining unit; a density data generating unit; and a dot data generating unit. The printing width determining unit determines a printing width value corresponding to a working distance of the print head in the prescribed direction. The density data generating unit generates density data specifying ink densities related to the quantity of ink for each pixel based on image data specifying a gradation value for each pixel and based on the printing width value, the density data generating unit generating the density data so that an upper limit on a tolerable ink density per pixel grows smaller as the working distance of the print head in the prescribed direction corresponding to the printing width value grows shorter. The dot data generating unit generates dot data by executing a halftone process on the density data generated by the density data generating unit.

21 Claims, 8 Drawing Sheets

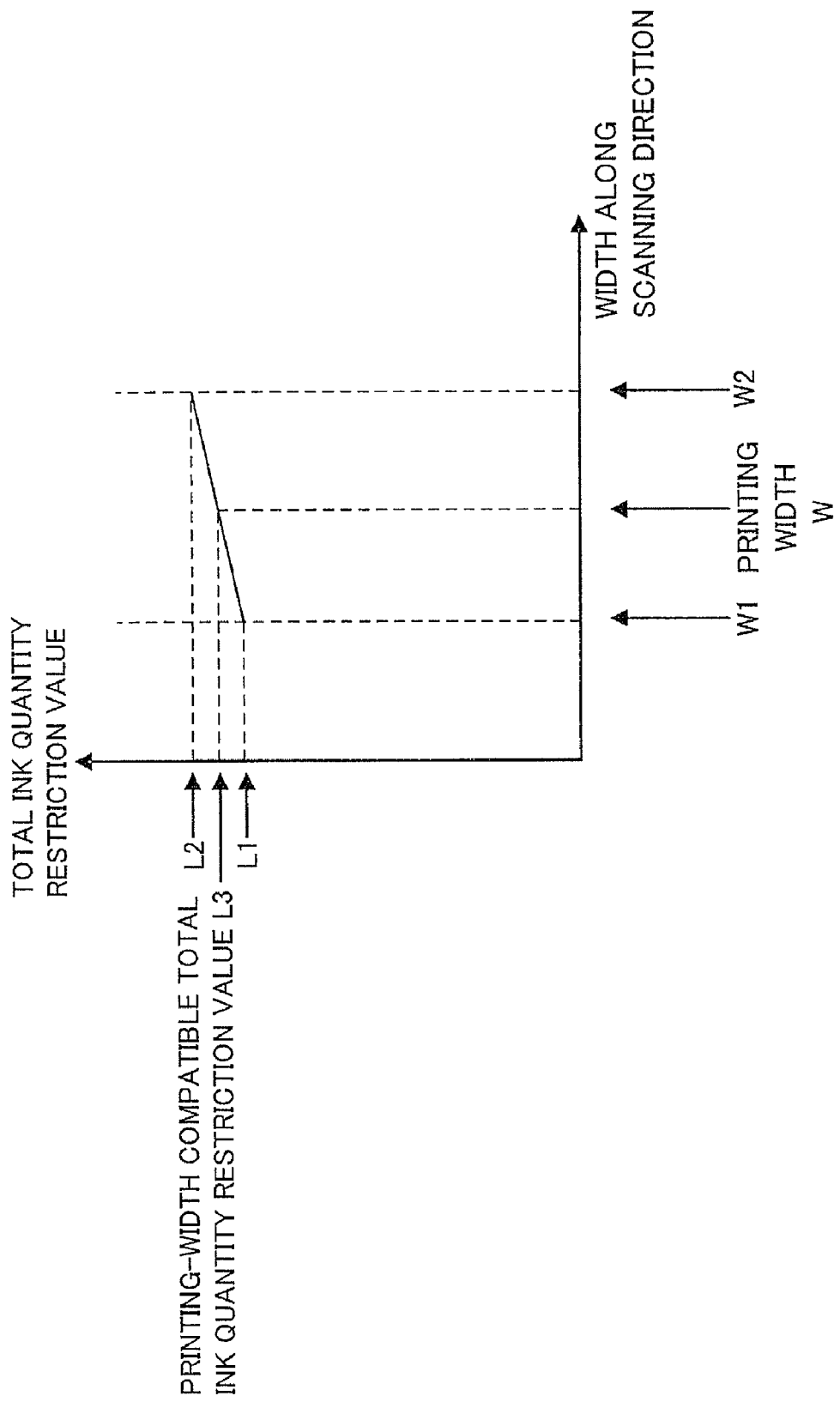

PRINT CONTROLLER FOR CONTROLLING INK JET PRINTER

CROSS REFERENCE TO RELATED APPLICATION

This application claims priority from Japanese Patent Application No. 2008-330935 filed Dec. 25, 2008. The entire content of this priority application is incorporated herein by reference.

TECHNICAL FIELD

The present invention relates to a print controller.

BACKGROUND

Ink ejected onto recording paper by an inkjet printer permeates the recording paper and dries over time. However, when printing on a recording paper that ink cannot easily permeate, such as normal gloss paper and gloss photo paper, the ink does not readily dry, often resulting in the mixing of dissimilar colors due to bleeding. While this bleeding problem can be suppressed simply by reducing the amount of ink ejected, there has also been a strong demand to use more ink in order to expand the color gamut. Hence, in the field of inkjet printers, it is vital to adjust the ink quantities to appropriate amounts suited to the situation. To this end, a concept for using a different color conversion table for each paper size has been proposed.

SUMMARY

It is an object of the invention to provide an improved print controller capable of controlling operations to print images using suitable quantities of ink, and a method of controlling the operations to print images using suitable quantities of ink.

In order to attain the above and other objects, the invention provides a print controller for generating dot data, which specifies a dot formation state and which is to be provided to a printing unit. The printing unit is configured to execute, based on the dot data, dot-forming operations to form dots in dot rows extending in a prescribed direction by moving a print head in the prescribed direction while ejecting ink droplets from nozzles in the print head and to print an image by repeatedly executing the dot-forming operation to form a plurality of dot rows juxtaposed in a direction orthogonal to the prescribed direction. The print controller includes: a printing width determining unit; a density data generating unit; and a dot data generating unit. The printing width determining unit determines a printing width value corresponding to a working distance of the print head in the prescribed direction. The density data generating unit generates density data specifying ink densities related to the quantity of ink for each pixel based on image data specifying a gradation value for each pixel and based on the printing width value, the density data generating unit generating the density data so that an upper limit on a tolerable ink density per pixel grows smaller as the working distance of the print head in the prescribed direction corresponding to the printing width value grows shorter. The dot data generating unit generates dot data by executing a halftone process on the density data generated by the density data generating unit.

According to another aspect, the present invention provides a method for generating dot data, which specifies a dot formation state and which is to be provided to a printing unit, the printing unit being configured to execute, based on the dot data, dot-forming operations to form dots in dot rows extending in a prescribed direction by moving a print head in the prescribed direction while ejecting ink droplets from nozzles in the print head and to print an image by repeatedly executing the dot-forming operation to form a plurality of dot rows juxtaposed in a direction orthogonal to the prescribed direction, the method including: determining a printing width value corresponding to a working distance of the print head in the prescribed direction; generating density data specifying ink densities related to the quantity of ink for each pixel based on image data specifying a gradation value for each pixel and based on the printing width value so that an upper limit on a tolerable ink density per pixel grows smaller as the working distance of the print head in the prescribed direction corresponding to the printing width value grows shorter; and generating dot data by executing a halftone process on the density data.

According to another aspect, the present invention provides a computer readable storage medium storing a set of program instructions for generating dot data, which specifies a dot formation state and which is to be provided to a printing unit, the printing unit being configured to execute, based on the dot data, dot-forming operations to form dots in dot rows extending in a prescribed direction by moving a print head in the prescribed direction while ejecting ink droplets from nozzles in the print head and to print an image by repeatedly executing the dot-forming operation to form a plurality of dot rows juxtaposed in a direction orthogonal to the prescribed direction, the instructions including: determining a printing width value corresponding to a working distance of the print head in the prescribed direction; generating density data specifying ink densities related to the quantity of ink for each pixel based on image data specifying a gradation value for each pixel and based on the printing width value so that an upper limit on a tolerable ink density per pixel grows smaller as the working distance of the print head in the prescribed direction corresponding to the printing width value grows shorter; and generating dot data by executing a halftone process on the density data.

BRIEF DESCRIPTION OF THE DRAWINGS

The particular features and advantages of the invention as well as other objects will become apparent from the following description taken in connection with the accompanying drawings, in which:

FIG. 8 is a graph showing relationships among an L-size total ink quantity restriction value L1, an A4-size total ink quantity restriction value L2, and a printing width-compatible total ink quantity restriction value L3.

DETAILED DESCRIPTION

Figure 1:
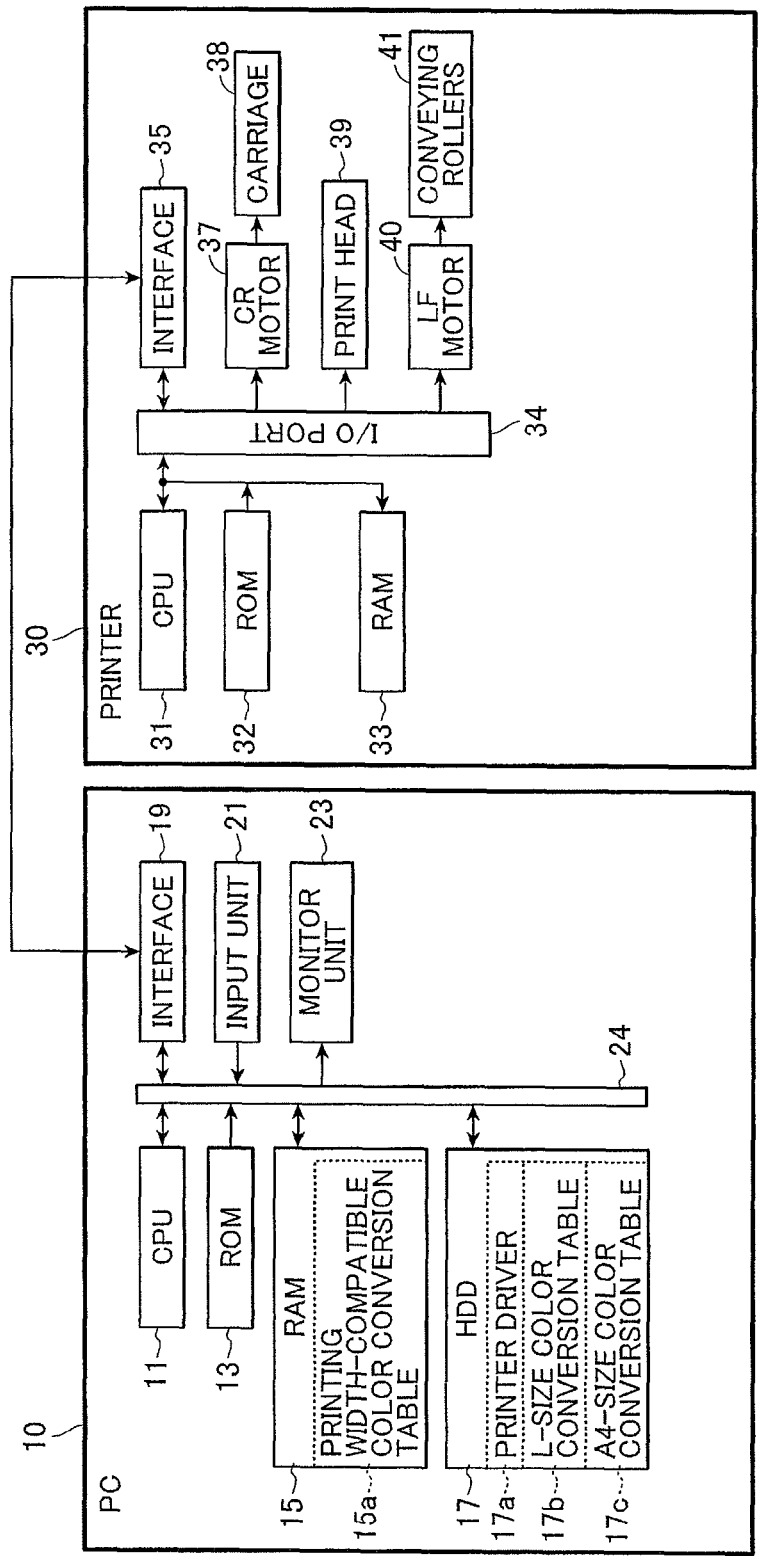
FIG. 1 is a block diagram conceptually illustrating an electrical structure of a PC and a printer according to a first embodiment of the present invention.

A print controller according to embodiments of the invention will be described while referring to the accompanying drawings wherein like parts and components are designated by the same reference numerals to avoid duplicating description.

FIG. 1 is a block diagram conceptually illustrating the electrical structure of a PC 10 and a printer 30 according to a first embodiment of the present invention. The PC 10 is primarily configured of a CPU 11, a ROM 13, a RAM 15, a hard disk drive 17 (hereinafter abbreviated to HDD 17), an interface 19, an input unit 21, and a monitor unit 23, all of which are interconnected via a bus line 24. The PC 10 is configured to instruct the printer 30 to print images in suitable ink quantities.

The CPU 11 controls each component of the PC 10 connected to the bus line 24 according to fixed values and programs stored in the ROM 13, RAM 15, and HDD 17. The ROM 13 is a memory unit that stores programs and the like for controlling operations of the PC 10. The RAM 15 is a readable and writable memory for temporarily storing data and the like required during processes executed by the CPU 11.

The RAM 15 is for storing a printing width-compatible color conversion table 15a. The printing width-compatible color conversion table 15a will be described later with reference to FIG. 3. The HDD 17 stores a printer driver 17a serving as a print control program, an L-size color conversion table 17b, and an A4-size color conversion table 17c. The color conversion tables 17b and 17c will be described later with reference to FIG. 3.

The input unit 21 functions to input user instructions and is configured of a keyboard, mouse, and the like, for example. The monitor unit 23 is configured of a CRT display or a liquid crystal display, for example, and serves as a visual display showing details of various processes, user-inputted data, and the like.

The printer 30 is an inkjet printer. The printer 30 has a central processing unit (CPU) 31, a ROM 32 storing various control programs executed by the CPU 31 and other data, and a RAM 33 for storing print data and control signals transmitted from the PC 10, which is connected to the printer 30. The CPU 31, ROM 32, and RAM 33 are connected to an I/O port 34.

The I/O port 34 is also connected to an interface 35, a CR motor 37, a print head 39, and an LF motor 40. The CPU 31 outputs ejection signals to the print head 39 for each nozzle formed therein based on print data transferred from the PC 10 via the interface 35. The CPU 31 also drives the CR motor 37 for reciprocating a carriage 38 supporting the print head 39, and drives the LF motor 40 for rotating conveying rollers 41 to convey a sheet of printing medium P. Examples of the printing medium P include sheets of paper and OHP sheets.

Figure 2A:
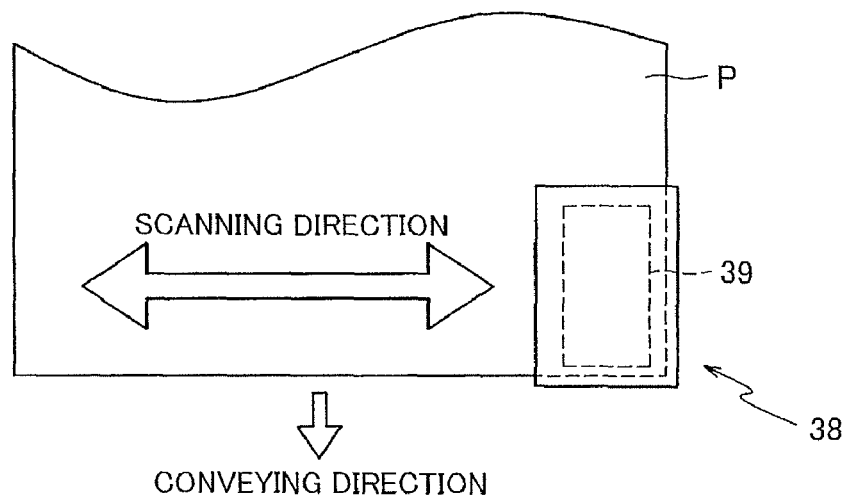
FIG. 2(a) is a partial plan view illustrating how a carriage is scanned over a printing medium.
Figure 2B:
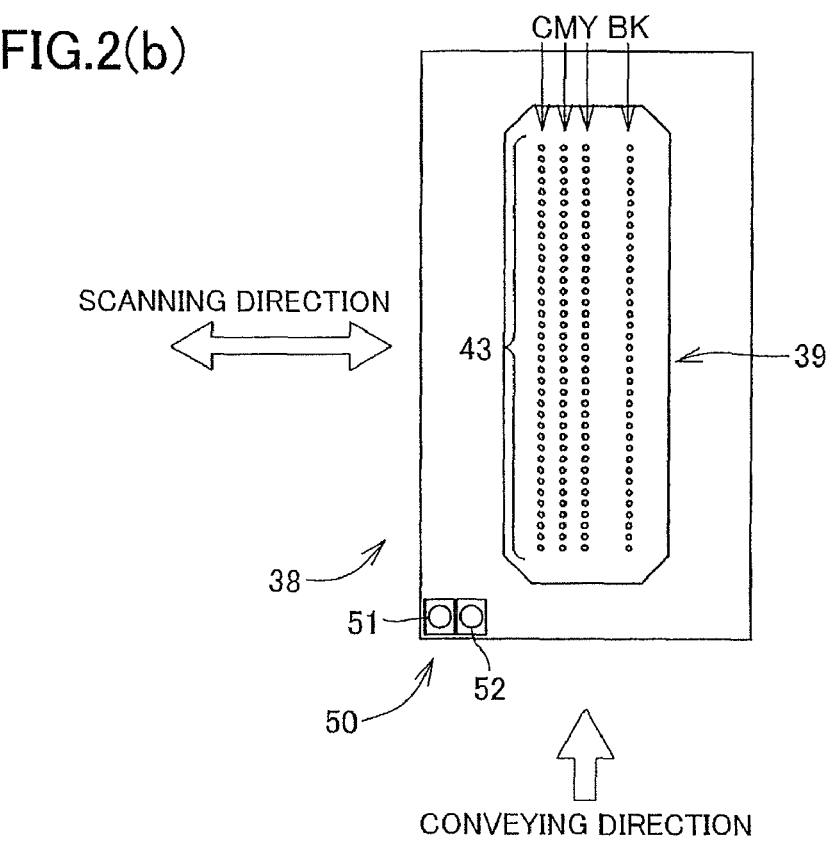
FIG. 2(b) is a bottom view of the carriage showing the bottom surface structure of the same.

FIG. 2(a) is a partial plan view illustrating how the carriage 38 is scanned over the printing medium P. FIG. 2(b) is a bottom view of the carriage 38 showing the bottom surface structure of the same.

By controlling the CR motor 37 (see FIG. 1), the printer 30 can move the print head 39 mounted on the carriage 38 in the scanning direction while ejecting ink from nozzles 43 provided in the bottom surface of the print head 39 to form rows of dots along the scanning direction on the printing medium P (hereinafter referred to as a "dot-forming operation"). The printer 30 prints an image by repeating this dot-forming operation to form rows of dots one after another in the conveying direction of the printing medium P, which is orthogonal to the scanning direction.

As shown in FIG. 2(b), a plurality of nozzles 43 for ejecting ink onto the printing medium P is formed in the bottom surface of the print head 39 in rows extending along the conveying direction of the printing medium P. A row of nozzles 43 is provided for each of the ink colors cyan (C), magenta (M), yellow (Y), and black (K or Bk). Hence, a plurality of rows of dots can be formed in one dot-forming operation executed with the print head 39. Ink for each of the four colors C, M, Y, and K is supplied to the print head 39.

As shown in FIG. 2(b), a media sensor 50 is provided together with the print head 39 on the carriage 38. The media sensor 50 is provided with a light-emitting element 51 configured of a light-emitting diode, and a light-receiving element 52 configured of a photosensor. The light-emitting element 51 irradiates light toward the printing medium P, while the light-receiving element 52 receives light reflected off the printing medium P. Based on the amount of reflected light received by the light-receiving element 52, the media sensor 50 can detect the presence of a sheet of printing medium P and edge positions of the sheet in the scanning direction.

For each dot-forming operation repeatedly performed while printing an image, the print head 39 is moved a working distance equivalent to the length of the rows of dots being formed in the current dot-forming operation. More specifically, the print head 39 is moved from one end of the dots being formed to the other end in the scanning direction. After printing rows of dots in one dot-forming operation, the print head 39 reverses directions, moving to the starting position for printing the next rows of dots, and begins a dot-forming operation for the next rows of dots. In other words, the print head 39 does not necessarily move from one end of the sheet of printing medium P to the other end in the scanning direction for each dot-forming operation, but rather moves from one end of the dot rows to the other, as described above. It is noted that if the scanning direction extends along the left-to-right direction of the sheet of printing medium P, if the print head 39 moves from the left to the right in some dot-forming direction, the print head 39 moves from the right to the left in the next dot-forming direction.

Since the working time of the print head 39 in a dot-forming operation is also long when the working distance of the print head 39 is long, sufficient time can be allocated for allowing the rows of dots printed in each dot-forming operation to permeate the printing medium P or dry, thereby avoiding such problems as ink overflow and bleeding, even when a larger quantity of ink is ejected onto the printing medium P. Conversely, since the working time of the print head 39 is short when the working distance in a dot-forming operation is short, a sufficient amount of time cannot be allocated for allowing the rows of dots printed in each dot-forming operation to permeate the printing medium P or dry.

Therefore, the printing width-compatible color conversion table 15a is generated in the present embodiment for lowering the upper limit on the tolerable ink density per pixel as the working distance of the print head 39 in the scanning direction is shortened.

Figure 3:
FIG. 3 shows an example of an L-size color conversion table, A4-size color conversion table, and printing width-compatible color conversion table.

FIG. 3 shows an example of the L-size color conversion table 17b, A4-size color conversion table 17c, and printing width-compatible color conversion table 15a. As shown in FIG. 3, each of the color conversion tables 15a, 17b, and 17c store correlations between RGB values indicating the brightness of each of the R, G, and B colors, and CMYK values indicating the ink density for each of the C, M, Y, and K colors, which is related to the quantity of ink. The R, G, and B values are defined in a range of 0 to 255. The C, M, Y, and K values are defined also in the range of 0 to 255. Using these correlations between RGB values and CMYK values set in the color conversion tables 15a, 17b, and 17c, the PC 10 can convert image data specifying RGB values for each pixel to density data specifying CMYK values for each pixel.

The L-size color conversion table 17b is a color conversion table suitable for L-size printing medium. Examples of the L-size printing medium include L-size photo paper. Each of the CMYK values in the L-size color conversion table 17b has been set so that the total ink density per pixel for all colors is no greater than a predetermined upper limit for L-size printing medium (562, for example). The total ink density per pixel signifies the value obtained by adding the ink densities of C, M, Y, and K for a single pixel. For example, the total ink density per pixel for all ink colors is 562 in the case of CYMK values (137, 113, 121, 191) corresponding to RGB values (0, 0, 0) since 137+113+121+191=562. When generating density data based on the L-size color conversion table 17b, the total ink density per pixel must not exceed the predetermined upper limit for L-size printing medium. In this way, the PC 10 can reliably suppress ink overflow and bleeding for printing operations corresponding to the printing width of an L-size printing medium P.

Similarly, the A4-size color conversion table 17c is a color conversion table suitable for A4-size printing medium. CMYK values in the A4-size color conversion table 17c have been set so that the total ink density per pixel for all colors is no greater than a predetermined upper limit for A4-size printing medium (579, for example). When density data is generated based on the A4-size color conversion table 17c, the total ink density per pixel for all ink colors is no greater than the predetermined upper limit for A4-size printing medium, thereby reliably suppressing ink overflow and bleeding in printing operations corresponding to the printing width of an A4 size printing medium P.

The upper limit set for A4-size printing medium is greater than that set for L-size printing medium because A4-size printing medium is larger than L-size printing medium. Consequently, the working distance of the print head 39 in the scanning direction is comparatively larger when printing at a width corresponding to A4-size printing medium P than when printing at a width corresponding to L-size printing medium P. So, it can be assumed that ink overflow and bleeding will not likely occur even if ejecting relatively large quantities of ink, when printing at a width corresponding to A4-size printing medium in comparison with when printing at a width corresponding to L-size printing medium.

While the color conversion tables 17b and 17c correspond to different sizes of printing medium P, the printing width-compatible color conversion table 15a corresponds to the working distance of the print head 39 in the scanning direction during a printing operation. In the present embodiment, the PC 10 finds a printing width W corresponding to the working distance of the print head 39 in the scanning direction, finds CMYK values using this printing width W and based on the CMYK values stored in the L-size color conversion table 17b and the CMYK values stored in the A4-size color conversion table 17c through linear interpolation, generates the printing width-compatible color conversion table 15a, and converts image data to density data using this printing width-compatible color conversion table 15a.

For each of the color conversion tables 17b and 17c, two versions of color conversion tables may be prepared and stored in the HDD 17 to correspond to a case in which the printing medium P is loaded vertically (i.e., with its longitudinal dimension aligned with the conveying direction), and a case in which the printing medium P is loaded horizontally (i.e., with its longitudinal dimension aligned with the scanning direction). However, to simplify the description of the embodiment, the following description will assume that the printing medium P is always loaded vertically in the printer 30 and that one each of the color conversion tables 17b and 17c corresponding to this vertical orientation are stored in the HDD 17.

Figure 4:
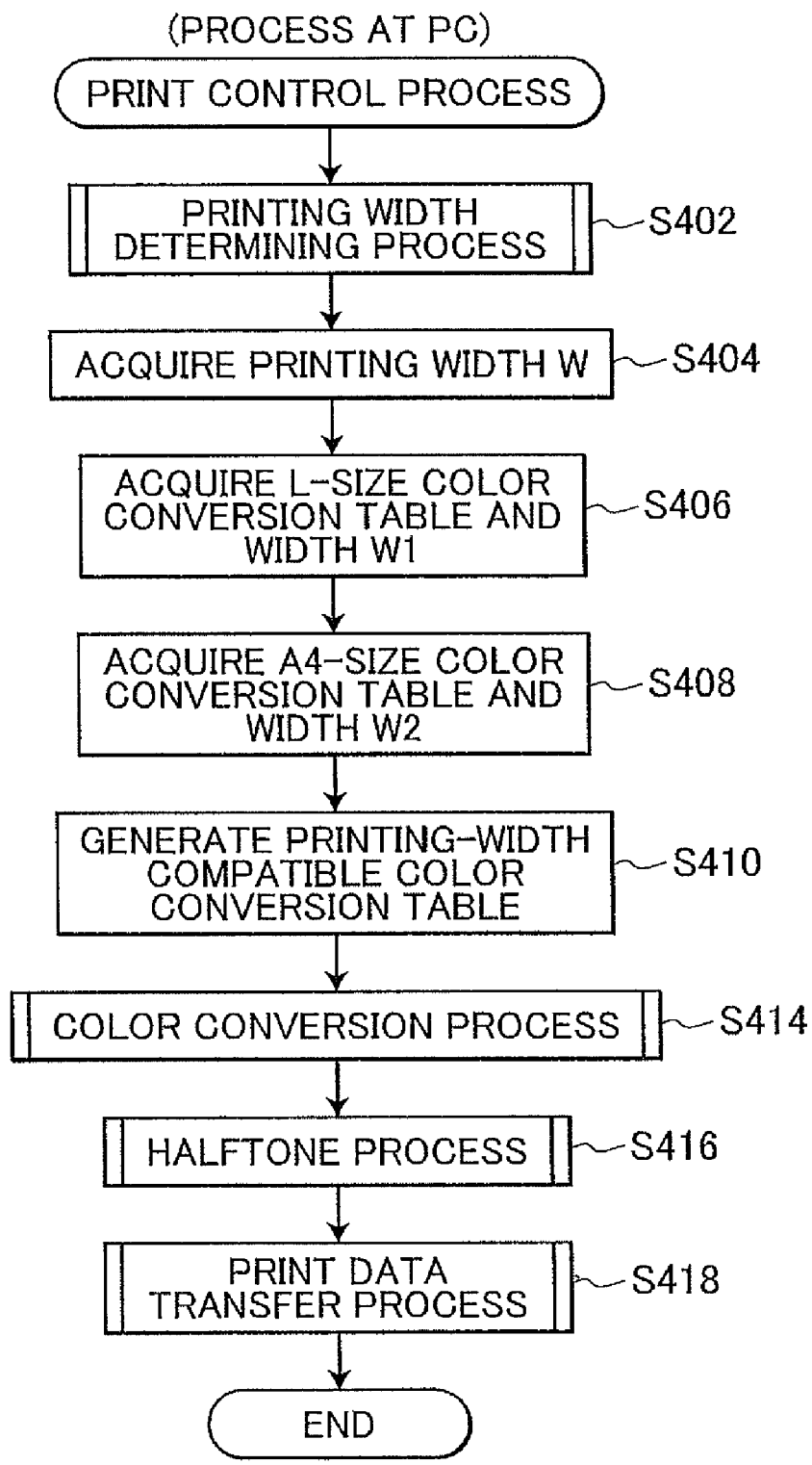
FIG. 4 is a flowchart illustrating steps in a print control process according to the first embodiment.

FIG. 4 is a flowchart illustrating steps in a print control process for generating the printing width-compatible color conversion table 15a and controlling the printer 30 to print an image. The CPU 11 of the PC 10 executes this print control process according to the printer driver 17a (see FIG. 1). Before the CPU 11 executes this process, the user selects image data to be printed. The user also selects a printing mode, in which the image data is to be printed. The printing mode can be selected in accordance with various parameters, such as a type of printing medium to be printed, and a printing quality. The user can also designate a borderless printing.

In S402 of the process shown in FIG. 4, the CPU 11 executes a printing width determining process to determine the printing width W of the image to be printed on the printer 30.

Figure 5A:
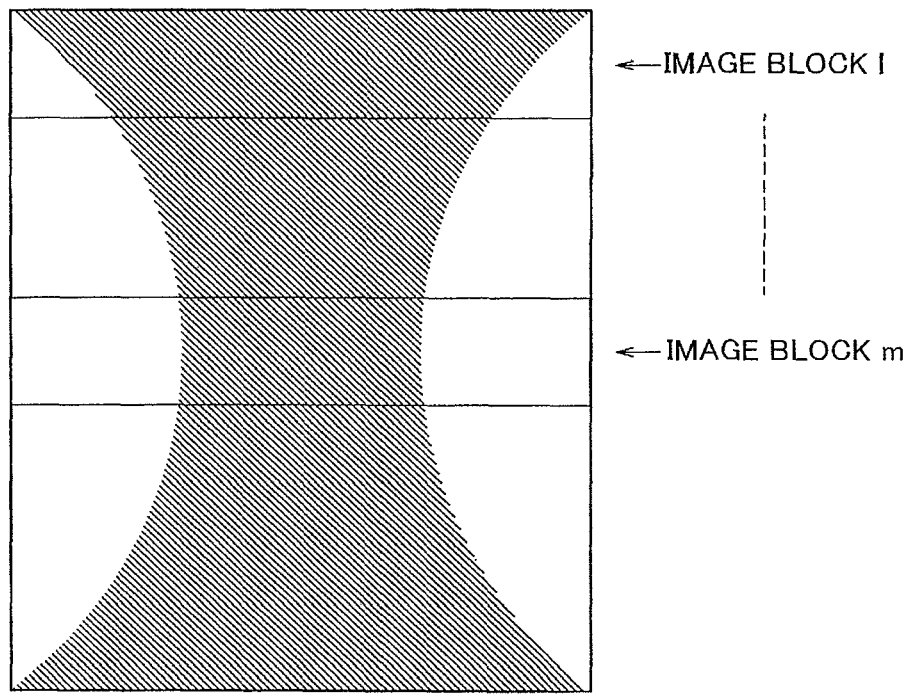
FIG. 5(a) conceptually illustrates image data targeted for printing.

Here, the printing width W set in the printing width determining process of S402 will be described with reference to FIG. 5(a). FIG. 5(a) conceptually illustrates the image data targeted for printing. The shaded region in FIG. 5(a) represents a region configured of color pixels (i.e., pixels having color), while the non-shaded region represents a region configured of colorless pixels (i.e., pixels having no color). All the R, G, and B components of the colorless pixels have the maximum value "255" in the range of 0 to 255. The colorless pixels therefore have the highest brightness in all the R, G, and B components. Contrarily, at least one of the R, G, and B components of the color pixels have brightness less than the maximum value of 255.

When forming an image corresponding to this image data on a sheet of printing medium P, the print head 39 moves from one end of the dot rows being formed to the other end of the dot rows in a dot-forming operation, as illustrated in FIG. 2, rather than moving from one end of the sheet of printing medium P to the other end. In other words, the working distance of the print head 39 differs according to the dot-forming operation. It is noted that a single dot-forming operation is defined as an operation, in which the print head 39 selectively forms dots, while being scanned in the scanning direction from one side to the other side, to form dot rows from one end of the dot rows to the other end of the dot rows.

In the printing width determining process of S402, the CPU 11 divides the image data into a plurality of image blocks and analyzes each block to find a printing width WB for each image block. Here, an image block signifies a unit that includes a group of pixels corresponding to the plurality of dot rows formed in a single dot-forming operation. The number of the dot rows formed in the single dot-forming operation is equal to the number of nozzles that are aligned in the printing-medium conveying direction on the print head 39 and that are used to eject ink in the single dot-forming operation. The number of the nozzles that are used to perform ink ejection in each dot-forming operation is previously determined dependently on the printing mode. In some printing mode, all the nozzles that are aligned in the printing-medium conveying direction on the print head 39 are used to eject ink selectively based on print data. So, in this printing mode, the number of the dot rows formed in the single dot-forming operation is equal to the number of all the nozzles that are aligned in the printing-medium conveying direction on the print head 39. In some other printing mode, however, only a part of the nozzles that are aligned in the recording medium conveying direction on the print head 39 are used to perform ink ejection. In this case, the number of the dot rows formed in the single dot-forming operation is equal to the number of the part of the nozzles that are aligned in the printing-medium conveying direction and that are used to eject ink in the dot-forming operation. The printing width WB of each image block is a value associated with the working distance of the print head 39 in the scanning direction for the single dot-forming operation corresponding to the same image block.

The CPU 11 sets the printing width W of the image being printed to the smallest printing width WB among the printing widths WB for all image blocks. In other words, the printing width W of the image being printed is set to the printing width WB corresponding to the dot-forming operation in which the working distance of the print head 39 in the scanning direction is shortest. With the sample image data shown in FIG. 5(*a*), the CPU 11 sets the printing width W to the printing width WB of image block m since the working distance of the print head 39 during the $m^{th}$ dot-forming operation executed based on the image block m is the shortest working distance in all dot-forming operations.

Next, the printing width WB of the image block will be described with reference to FIG. 5(*b*). FIG. 5(*b*) conceptually illustrates image block m. Each of the squares in FIG. 5(*b*) represents a pixel. That is, shaded squares represent color pixels, and non-shaded squares represent colorless pixels. As shown in FIG. 5(*b*), the image block includes a plurality of rows of pixels (five rows in this example) aligned in a direction corresponding to the scanning direction (left-to-right direction in FIG. 5(*b*)). In other words, five nozzles from among all the nozzles aligned in the printing-medium conveying direction on the print head 39 are used to selectively eject ink in the single dot-forming operation to form the image block m.

In the embodiment, the CPU 11 identifies a color pixel 54 among color pixels in the group of pixels that corresponds to a position equivalent to one end in the scanning direction, and a color pixel 55 that corresponds to a position equivalent to the other end in the scanning direction, and sets the printing width WB of the image block to a scanning direction component of the distance between positions corresponding to the color pixels 54 and 55. In a halftone process performed after converting RGB image data to CMYK density data, the CPU 11 compares ink densities in the CMYK data to threshold values in order to convert the ink density of each pixel to a binary value indicating either an ON dot or a OFF dot. Accordingly, a dot is not always formed for each pixel corresponding to a color pixel in the image data. Therefore, the value of the printing width WB found according to the above process does not always accurately represent the working distance of the print head 39 in the scanning direction. However, since the printing width WB approximately corresponds to the working distance of the print head 39 in the scanning direction, the printing width WB is treated as a value corresponding to the working distance of the print head 39 in the scanning direction in the present embodiment.

The print head 39 may not perform ink ejection operation for such an image block that includes no color pixels but includes only colorless pixels having RGB values of (255, 255, 255). In such a case, the CPU 11 does not acquire a printing width WB for this image block in the embodiment.

Returning to FIG. 4, in S404 the CPU 11 acquires the printing width W determined in the printing width determining process of S402. In S406 the CPU 11 acquires the L-size color conversion table 17*b* and a width W1 of an L-size printing medium P, and in S408 acquires the A4-size color conversion table 17*c* and a width W2 for an A4-size printing medium P. The widths W1 and W2 of the printing medium P correspond to the lengths of printing medium P loaded in the printer 30 from one end to the other in the scanning direction. Hence, when the printing medium P is loaded vertically in the printer 30, the shorter dimension of the printing medium P corresponds to the widths W1 and W2. The widths W1 and W2 of the printing medium P are pre-stored in the HDD 17.

In S410 the CPU 11 generates the printing width-compatible color conversion table 15*a* (see FIG. 3) based on the color conversion tables 17*b* and 17*c*. In this process, the CPU 11 finds CMYK values through linear interpolation of CMYK values stored in the L-size color conversion table 17*b* and CMYK values stored in the A4-size color conversion table 17*c* based on the printing width W, and stores these CMYK values in the printing width-compatible color conversion table 15*a* in association with RGB values. The CMYK values stored in the printing width-compatible color conversion table 15*a* are calculated according to the following equation (1), for example:

(CMYK values in the printing width-compatible color conversion table)=

[(CMYK values in the A4-size color conversion table)−(CMYK values in the L-size color conversion table)]×α+(CMYK values in the L-size color conversion table)     (1)

wherein α is an interpolation constant satisfying the following equation (2):

α=[(printing width *W*)−(width *W*1)]/[(width *W*2)−(width *W*1)]     (2)

Since the interpolation coefficient α is smaller for smaller values of the printing width W in the above equation, the CMYK values in the printing width-compatible color conversion table 15*a* are smaller as a result. In other words, the above equations are used to acquire correlations between RGB values and CMYK values set such that the upper limit of tolerable ink densities per pixel are smaller for smaller values of the printing width W.

In S414 the CPU 11 executes a color conversion process using the correlations in the printing width-compatible color conversion table 15*a* acquired above. In this process, the CPU 11 generates density data specifying CMYK values for each pixel based on the image data specifying RGB values for each pixel by converting the RGB values of pixels to CMYK values based on correlations acquired according to the printing width W. Therefore, the CPU 11 can generate density data in which the upper limit on tolerable ink densities per pixel is smaller for smaller values of printing width W.

In S416 the CPU 11 performs a halftone process on the density data to produce dot data. In the halftone process, the CPU 11 converts the ink densities for each pixel to values indicating ON (formation of a dot) or OFF (non-formation of a dot) by comparing the ink densities of each pixel to threshold values, for example. Thus, by forming dots on printing medium based on this dot data, the printer 30 can print an image on the printing medium in which lightness and darkness is rendered by the occurrence rate of dots. The halftone process of S416 may be performed based on the error diffusion method or the dither method.

In S418 the CPU 11 executes a print data transfer process. In this process, the CPU 11 adds a command to the generated dot data and transfers this data to the printer 30 as print data. Subsequently, the CPU 11 ends the current print control process.

According to the print control process described above, the PC 10 generates density data in which the upper limit on tolerable ink densities per pixel is reduced as the working distance (printing width W) of the print head 39 in the scanning direction is shortened. Accordingly, the PC 10 can control the printer 30 to print an image using suitable quantities of ink.

In other words, the upper limit on tolerable ink densities per pixel is relatively smaller when the working distance of the print head 39 is shorter. This density data restricts the number of pixels determined to have ink densities no less than threshold values (pixels set to ON) in dot data obtained from the density data in the halftone process of S416, thereby restricting the number of dots that are formed on the printing medium P. In other words, this process can restrict the quantity of ink ejected onto the printing medium P. Therefore, the PC 10 according to the embodiment can suppress the occurrence of ink overflow and bleeding, even when the working distance of the print head 39 is short and the next dot forming operation is begun without allocating a long drying time for the rows of dots printed in the previous dot-forming operation.

On the other hand, the upper limit on tolerable ink densities per pixel is set relatively high for long working distances of the print head 39. In this case, a broader gamut of colors can be expressed using relatively large quantities of ink. Further, since a sufficiently long drying time can be allocated for rows of dots formed in each dot-forming operation when the working distance of the print head 39 is long, it is unlikely that ink overflow or bleeding will occur, even when ejecting larger quantities of ink on the printing medium P.

Figure 6:
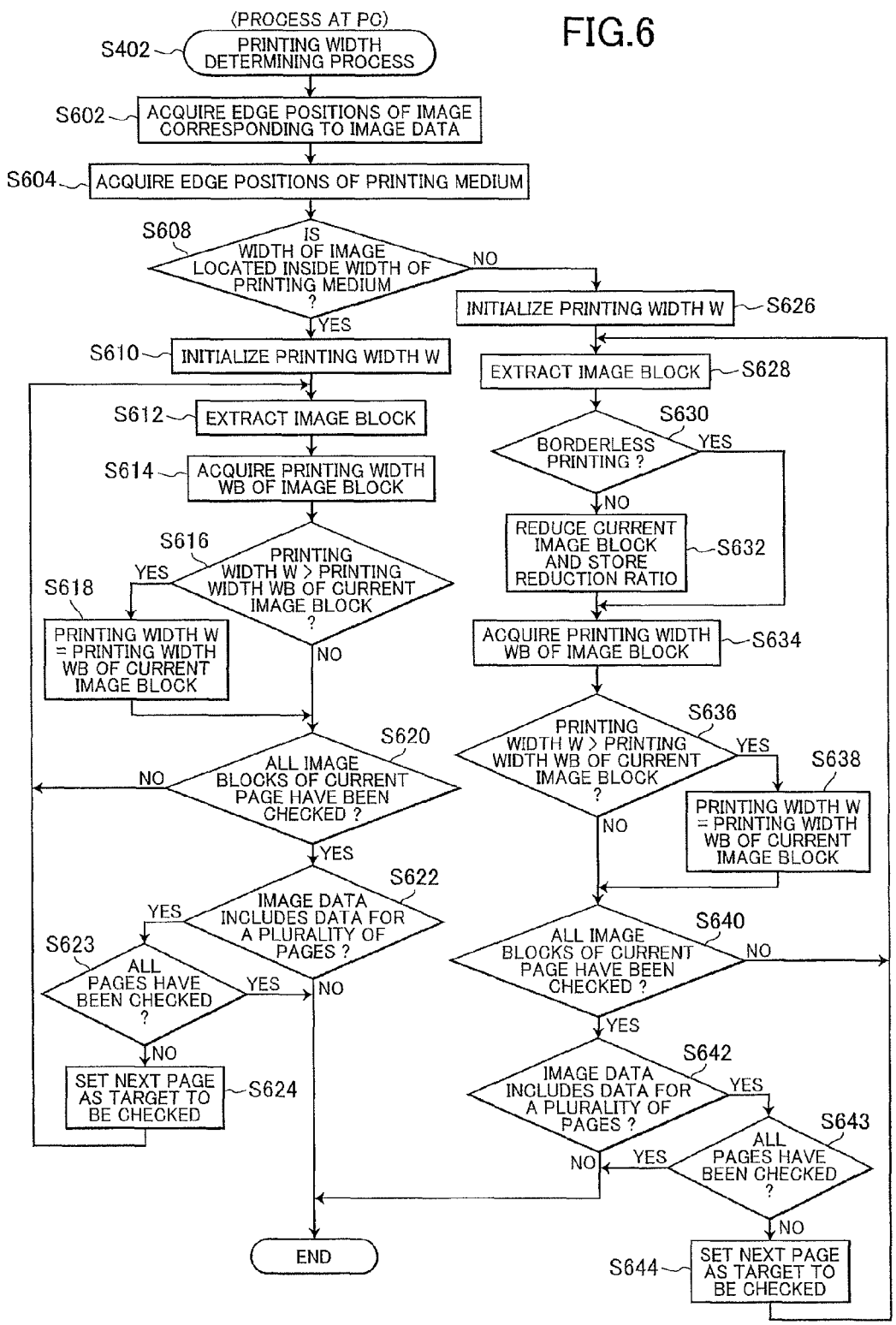
FIG. 6 is a flowchart illustrating steps in a printing width determining process in the print control process of FIG. 4.

Next, the printing width determining process of S402 for determining the printing width W will be described with reference to FIG. 6. FIG. 6 is a flowchart illustrating steps in this process. In S602 the CPU 11 acquires edge positions of the image corresponding to the image data with respect to the scanning direction. In S604 the CPU 11 acquires edge positions of the printing medium P on which the image will be printed with respect to the scanning direction. The media sensor 50 provided on the print head 39 (see FIG. 2) detects the edge positions of the printing medium P.

In S608 the CPU 11 determines whether the entire width of the image corresponding to the image data is located inside the entire width of the printing medium P. Specifically, the CPU 11 determines, with respect to the point of origin represented by a fixed point (one end, for example) on the path followed by the reciprocating carriage 38, the positional relationship between edge positions of the printing medium P in the scanning direction and edge positions of the image corresponding to the image data. In other words, the CPU 11 determines whether the left edge of the image is located not to the left of the left edge of the printing medium P and whether the right edge of the image is located not to the right of the right edge of the printing medium P, wherein the scanning direction extends in the left-and-right direction.

The CPU 11 determines that the entire width of the image is located inside the entire width of the printing medium P when the left edge of the image is located not to the left of the left edge of the printing medium P and the right edge of the image is located not to the right of the right edge of the printing medium P. When the CPU 11 determines that the entire width of the image is located inside the entire width of the printing medium P (S608: YES), in S610 the CPU 11 initializes the printing width W to the width of the printing medium P. In S612 the CPU 11 extracts a single image block (see FIG. 5) from the image data. In S614 the CPU 11 analyzes the extracted image block to acquire the printing width WB of the image block. Since the method of acquiring the printing width WB has already been described with reference to FIG. 5(*b*), this description will not be repeated. Although not described in the flowchart, the CPU 11 cannot acquire the printing width WB when the extracted image block includes no color pixels. In this case, the CPU 11 returns to S612 and performs the process on the next image block.

In S616 the CPU 11 determines whether the printing width W is greater than the printing width WB of the current image block. If the printing width W is greater than the printing width WB of the current image block (S616: YES), in S618 the CPU 11 sets the printing width W to the printing width WB of the current image block. However, if the printing width W is less than or equal to the printing width WB of the current image block (S616: NO), in S620 the CPU 11 determines whether all image blocks of the current page have been checked. If there remain unchecked image blocks (S620: NO), the CPU 11 returns to S612 and extracts the next image block.

The CPU 11 repeats the above process until all image blocks of the current page have been checked (S620: YES). In S622 the CPU 11 determines whether the image data includes data for a plurality of pages. It is noted that the judgment in S622 is made positive, for example, when a plurality of pages worth of data is included in the image data for a normal printing operation in which images are to be printed at their original size. The judgment in S622 is made positive also when the image data includes a plurality of pages worth of data that is generated by enlarging a single page worth of image data, such as when performing a multi-page printing to create a relatively large-sized image, such as a poster.

If the image data does not include data for a plurality of pages (S622: NO), the CPU 11 ends the printing width determining process of S402 and returns to S404 of FIG. 4. Through this process, the CPU 11 can set the printing width W to a value corresponding to the shortest working distance of the print head 39 in the scanning direction among all dot-forming operations performed repeatedly to print the image.

However, when image data is provided for a plurality of pages (S622: YES), in S623 the CPU 11 determines whether all pages have been checked. If there remain pages to be checked (S623: NO), in S624 the CPU 11 sets the next page in the image data as the target page to be checked and repeats the above process from S612. Once the CPU 11 has determined that all pages have been checked (S623: YES) after repeatedly performing the above process, the CPU 11 ends the printing width determining process.

Next, a description will be given for the case in which the CPU 11 determines in S608 that the entire width of the image corresponding to the image data is not located inside the entire width of the printing medium P, that is, the case in which the left edge of the image is located to the left of the left edge of the printing medium P and/or the right edge of the image is located to the right of the right edge of the printing medium P. One example in which a negative determination may be made in S608 is when the user has selected borderless printing. Since dots are formed all the way to the edges of the printing medium P in a borderless printing operation, the width of the image corresponding to the image data may be set slightly larger than the width of the printing medium P. Another example in which a negative determination may be made in S608 is when an incorrect size of printing medium P has been loaded in the printer 30.

If the CPU 11 determines that the entire width of the image is not located inside the entire width of the printing medium P (S608: NO), in S626 the CPU 11 initializes the printing width W. Here, the initial value of the printing width W may be set to the width of the printing medium P in the scanning direction in S626 when the user has selected borderless printing. When the user has not selected borderless printing, the initial value of the printing width W is set to a value obtained by subtracting the total length of margins (left margin and right margin) in the scanning direction from the width of the printing medium P loaded in the printer 30 (width of printing medium in scanning direction—total length of margins in scanning direction).

In S628 the CPU 11 extracts one image block from the image data and in S630 determines whether borderless printing has been selected. If borderless printing has not been selected (S630: NO), the CPU 11 assumes that the size of the printing medium P loaded in the printer 30 is incorrect. Therefore, in S632 the CPU 11 reduces the current image block by a reduction ratio set so that the image corresponding to the image data fits within the printing medium P, and stores this reduction ratio. When subsequently performing the color conversion process in S414 of FIG. 4, the CPU 11 reads this reduction ratio from memory and reduces the image data based on this reduction ratio, before subjecting the image data to color conversion.

Figure 5B:
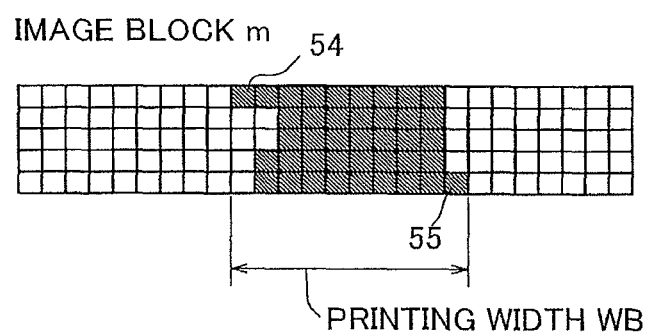
FIG. 5(b) conceptually illustrates image block m.

In S634, the CPU 11 analyzes the extracted image block to acquire the printing width WB of the image block (see FIG. 5(b)). If the image block has been reduced in S632, the CPU 11 acquires the printing width WB for the reduced image block. Although not described in the flowchart, the CPU 11 cannot acquire the printing width WB when the extracted image block includes no color pixels. In this case, the CPU 11 returns to S628 and performs the process on the next image block.

In S636 the CPU 11 determines whether the printing width W is greater than the printing width WB of the current image block. If the printing width W is greater than the printing width WB of the current image block (S636: YES), in S638 the CPU 11 sets the printing width W to the printing width WB of the current image block. However, if the printing width W is less than or equal to the printing width WB of the current image block (S636: NO), in S640 the CPU 11 determines whether all image blocks of the current page have been checked. If there remain unchecked image blocks (S640: NO), the CPU 11 returns to S628 and extracts the next image block.

The CPU 11 repeats the above process until all image blocks of the current page have been checked (S640:YES). In S642 the CPU 11 determines whether the image data includes data for a plurality of pages. If the image data does not include data for a plurality of pages (S642: NO), the CPU 11 ends the printing width determining process of S402 and returns to S404 of FIG. 4. Through this process, the CPU 11 can set the printing width W to a value corresponding to the shortest working distance of the print head 39 in the scanning direction among all dot-forming operations performed repeatedly to print the image. However, when image data is provided for a plurality of pages (S642: YES), in S643 the CPU 11 determines whether all pages have been checked. If there remain pages to be checked (S643: NO), in S644 the CPU 11 sets the next page in the image data as the target page to be checked and repeats the above process from S628. Once the CPU 11 has determined that all pages have been checked (S643:YES) after repeatedly performing the above process, the CPU 11 ends the printing width determining process.

Since the time required for performing a dot-forming operation from start to finish is comparatively short in a dot-forming operation having the shortest working distance in the scanning direction than in other dot-forming operations, the quantity of ink that permeates the printing medium or dries thereon during the dot-forming operation with the shortest working distance is comparatively smaller than in the other dot-forming operations. Hence, by setting the printing width value to a value corresponding to the shortest working distance, ink overflow and bleeding can be reliably suppressed.

Since the printing width W is initialized to the width of the printing medium P in the scanning direction when performing a borderless printing operation in the current process, the printing width W remains set to the width of the printing medium P when this width is smaller than the printing widths WB acquired from each image block. Accordingly, the PC 10 according to the embodiment can set an appropriate printing width W in this case. Since the printing width-compatible color conversion table 15a is generated based on the printing width W, as described earlier, it is preferable that the printing width W be set to a value close to the actual working distance of the print head 39. While the size of the image corresponding to image data is larger than the size of the printing medium P in borderless printing, the media sensor 50 and the like (see FIG. 2) can detect the edges of the printing medium P in the scanning direction so that the print head 39 is not actually scanned to regions outside the printing medium P, i.e., so that ink is not actually ejected in areas beyond the edges of the printing medium P. Hence, by setting the printing width W to the width of the printing medium P in the scanning direction when the width of the printing medium P is smaller than the printing width WB, the PC 10 can set the printing width W to a value near the actual working distance of the print head 39.

Through the process described above, when the image data includes data for a plurality of pages (yes in S622 or yes in S642), the CPU 11 sets the printing width W to a value corresponding to the smallest working distance of the print head 39 required for all dot-forming operations performed when printing the plurality of pages. In this way, the CPU 11 converts image data for a plurality of pages to density data based on a common printing width W for all pages, thereby preventing an unnatural color difference among pages. Hence, when performing a multi-page printing operation to create an enlarged image by printing images on a plurality of pages based on image data for a plurality of pages that was generated by enlarging image data for a single page and subsequently assembling the printed pages together, it is possible to create a suitable enlarged image showing no unnatural variation in color at the borders of the assembled pages.

In the above description, the CPU 11 determines in S608 whether the entire width of the image is located inside the entire width of the printing medium P. However, the CPU 11 may determine whether the entire width of the image is located inside the entire width of a printing region defined on the printing medium P. The printing region is an area defined on the printing medium P as a part other than the margins (left and right margins) in the scanning direction. In other words, the CPU 11 determines whether the left edge of the image is located not to the left of the left edge of the printing region of the printing medium P and whether the right edge of the image is located not to the right of the right edge of the printing region of the printing medium P, wherein the scanning direction extends in the left-and-right direction. The CPU 11 determines that the entire width of the image is located inside the entire width of the printing region of the printing medium P when the left edge of the image is located not to the left of the left edge of the printing region of the printing medium P and the right edge of the image is located not to the right of the right edge of the printing region of the printing medium P. The CPU 11 determines that the entire width of the image is not located inside the entire width of the printing region of the printing medium P when the left edge of the image is located to the left of the left edge of the printing region of the printing medium P and/or the right edge of the image is located to the right of the right edge of the printing region of the printing medium P. When the CPU 11 determines that the entire width of the image is located inside the entire width of the printing region of the printing medium P (S608: YES), in S610 the CPU 11 may initialize the printing width W to a value obtained by subtracting the total length of margins (left margin and right margin) in the scanning direction from the width of the printing medium P loaded in the printer 30 (width of printing medium in scanning direction total length of margins in scanning direction).

Next, a second embodiment of the present invention will be described with reference to FIGS. 7 and 8. The electrical structure of the PC 10 according to the second embodiment is substantially identical to that of the PC 10 according to the first embodiment except for the points described below.

In the first embodiment described above, the PC 10 generates a printing width-compatible color conversion table 15*a* corresponding to the printing width W in the print control process of FIG. 4. However, in the print control process according to the second embodiment, the PC 10 sets a printing-width compatible total ink quantity restriction value L3 corresponding to the printing width W. An L-size total ink quantity restriction value L1 for L-size printing medium P and an A4-size total ink quantity restriction value L2 for A4-size printing medium P are pre-stored in the HDD 17.

Prior to describing the print control process according to the second embodiment, a description will be given of a total ink quantity restricting process executed on the PC 10 according to the second embodiment.

The total ink quantity restricting process is performed to reduce the overall density of chromatic color ink (C, M, and Y, in this example) so that the total ink density per pixel for all colors (C, M, Y, and K, in this example) is no greater than the printing-width compatible total ink quantity restriction value L3. The total ink quantity restricting process can be performed using the following equations (3), wherein the ink densities of the C, M, Y, and K colors prior to performing the total ink quantity restricting process are represented by C', M', Y', and K', the ink densities of the C, M, Y, and K colors after performing the total ink quantity restricting process are represented by C", M", Y", and K", and the printing-width compatible total ink quantity restriction value is represented by L3.

When Sum $\leq$ L3, $$C'=C'', M'=M'', Y'=Y'', K'=K''$$

When Sum >L3, $$C''=C'*(L3-K')/(\text{Sum}-K')$$

$$M''=M'*(L3-K')/(\text{Sum}-K')$$

$$Y''=Y'*(L3-K')/(\text{Sum}-K')$$

$$K'=K' \quad (3)$$

wherein the value "Sum" satisfies the following equation:

$$\text{Sum}=C'+M'+Y'+K'$$

As is clear from the above equations, the total ink quantity restricting process sets the sum of ink densities C", M", Y", and K" to a value less than or equal to the printing-width compatible total ink quantity restriction value L3 by reducing only ink densities for colors other than black. Hence, the printing-width compatible total ink quantity restriction value L3 is equivalent to an upper limit of the tolerable sum of ink densities per pixel for all colors, and the smaller the printing-width compatible total ink quantity restriction value L3 the smaller the maximum of the sum of ink densities per pixel for all colors.

Figure 7:
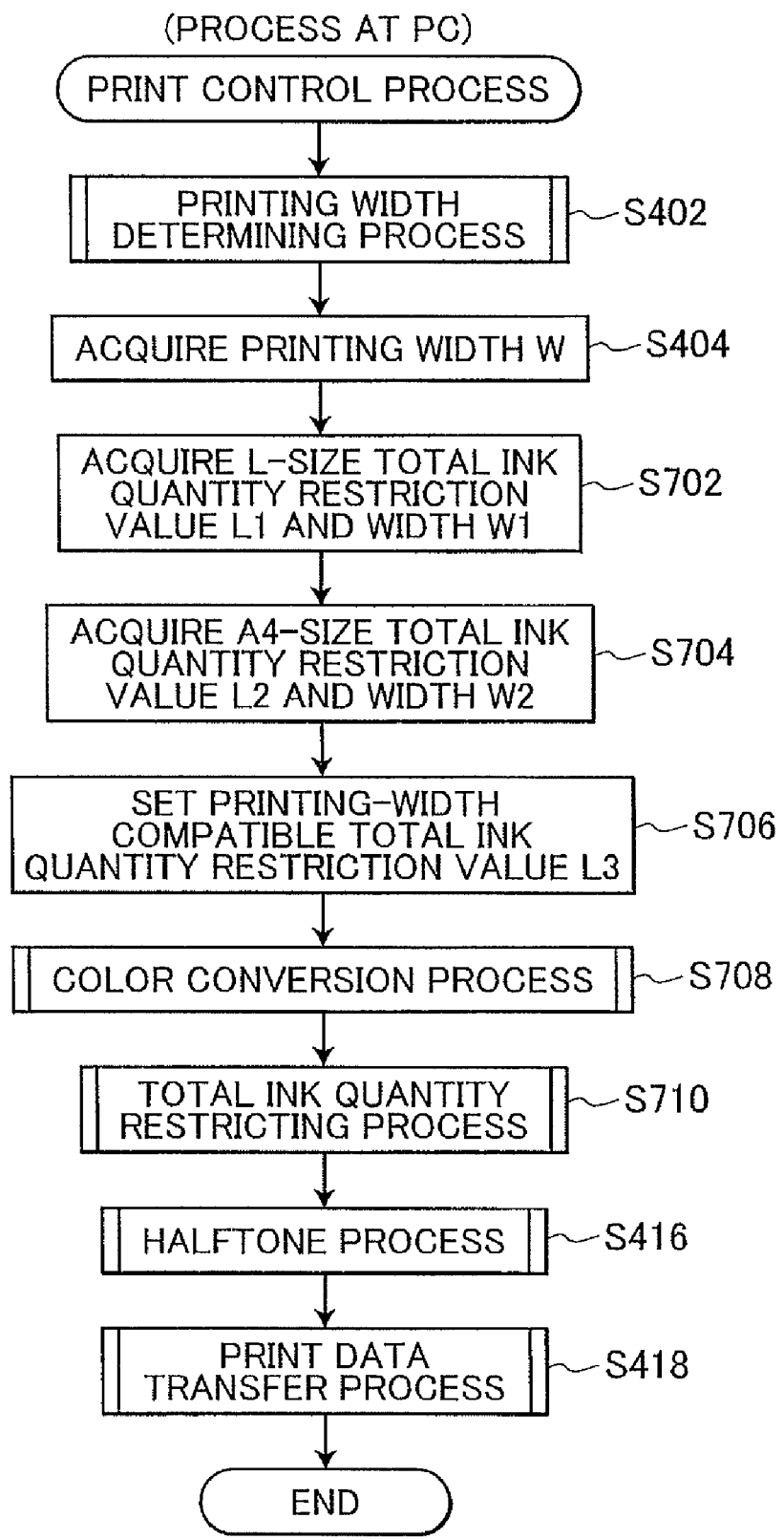
FIG. 7 is a flowchart illustrating steps in a print control process according to a second embodiment of the present invention.

FIG. 7 is a flowchart illustrating steps in the print control process according to the second embodiment that is executed by the CPU 11 in place of the print control process shown in FIG. 4. Steps in the print control process according to the second embodiment identical to those described with reference to FIG. 4 have been designated with the same step numbers to avoid duplicating descriptions.

In S702 of the print control process shown in FIG. 7, the CPU 11 acquires the L-size total ink quantity restriction value L1 and the width W1 of L-size printing medium P. In S704 the CPU 11 acquires the A4-size total ink quantity restriction value L2 and the width W2 of A4-size printing medium P. The widths W1 and W2 of the printing medium P are the same as those described in the first embodiment.

In S706 the CPU 11 sets the printing width-compatible total ink quantity restriction value L3 by performing linear interpolation on the L-size total ink quantity restriction value L1 and A4-size total ink quantity restriction value L2 based on the printing width W. The printing width-compatible total ink quantity restriction value L3 is set to smaller values for smaller values of the printing width W. FIG. 8 is a graph showing relationships among the total ink quantity restriction value L1, L2, and L3. The L-size total ink quantity restriction value L1 is set to a value smaller than the A4-size total ink quantity restriction value L2 since an L-size sheet is narrower than an A4-size sheet. The printing width-compatible total ink quantity restriction value L3 is set to a value between the total ink quantity restriction value L1 and L2 if the printing width W is between the widths W1 and W2 of the L-size sheet and the A4-size sheet. As shown in FIG. 8, the printing width-compatible total ink quantity restriction value L3 is set to a value that approaches the L-size total ink quantity restriction value L1 as the printing width W approaches the width W1 of the L-size sheet.

Returning to FIG. 7, in S708 the CPU 11 performs a color conversion process. In the color conversion process of the first embodiment described with reference to FIG. 4 (S414), the CPU 11 generates density data from image data using the printing width-compatible color conversion table 15*a* acquired based on the printing width W. However, in the color conversion process according to the second embodiment (S708), the CPU 11 converts image data specifying RGB values for each pixel to color conversion data C'M'Y'K' specifying CMYK values for each pixel by referencing correlations between RGB values and CMYK values set in the A4-size color conversion table 17*c* stored in the HDD 17.

In S710 the CPU 11 executes a total ink quantity restricting process using the printing width-compatible total ink quantity restriction value L3. In the print control process according to the second embodiment, the CPU 11 generates density data C"M"Y"K" by performing the total ink quantity restricting process on the color conversion data C'M'Y'K' using the printing width-compatible total ink quantity restriction value L3 and by using the equation (3) described above.

In the above description, the L-size color conversion table 17*b* is not used in S708. So, the L-size color conversion table 17*b* may not be stored in the HDD 17.

In the above description, in S708, the A4-size color conversion table 17c is used, but the L-size color conversion table 17b is not used. This is because, as shown in FIG. 3, the CMYK values listed in the A4-size color conversion table 17c are greater than the corresponding CMYK values listed in the L-size color conversion table 17b. The CMYK values represent the amounts of CMYK inks. So, by using the A4-size color conversion table 17c in S708, it is possible to provide sufficiently large amounts of differences in the ink ejection amounts between various printing operations having different amounts of printing widths.

In the above description, the A4-size color conversion table 17c is used in S708. However, a color conversion table suitable for a printing medium having a maximum width that can be conveyed in the printer 30 (maximum-size color conversion table) may be stored in the HDD 17 and be used in S708 instead of the A4-size color conversion table 17c. The maximum-size color conversion table stores correlations between RGB values and CMYK values similarly to the A4-size color conversion table 17c. CMYK values in the maximum-size color conversion table have been set so that the total ink density per pixel for all colors is no greater than a predetermined upper limit for the maximum size printing medium. If the width of the maximum size printing medium is greater than the width of the A4-size, the upper limit for the maximum size printing medium is greater than the upper limit for the A4-size printing medium, and the CMYK values listed in the maximum-size color conversion table are greater than the corresponding CMYK values listed in the A4-size color conversion table 17c.

While the invention has been described in detail with reference to the embodiments thereof, it would be apparent to those skilled in the art that various changes and modifications may be made therein without departing from the spirit of the invention.

For example, in the first embodiment described above, the two color conversion tables 17b and 17c are prepared in advance, and the printing width-compatible color conversion table 15a is generated based on these two types of color conversion tables.

However, the PC 10 may be prestored with three or more color conversion tables, which have been prepared in advance for three or more kinds of printing medium having different widths and which indicate correlations between RGB values and CMYK values. The PC 10 selects two color conversion tables from among the three or more color conversion tables, and generates the printing width-compatible color conversion table 15a based on these two color conversion tables. The two color conversion tables include: a first color conversion table whose corresponding printing medium width is closest to the printing width W of the image being printed; and a second color conversion table whose corresponding printing medium width is second closest to the printing width W of the image being printed.

In the above description, the PC 10 generates the printing width-compatible color conversion table 15a based on the prestored color conversion tables. However, the PC 10 may not generate the printing width-compatible color conversion table 15a. In this modification, the PC 10 is prestored with two or more color conversion tables, which have been prepared in advance for two or more kinds of printing medium having different widths and which indicate correlations between RGB values and CMYK values. The PC 10 simply selects a color conversion table, whose corresponding printing medium width is closest to the printing width W of the image being printed, from among the plurality of color conversion tables, and converts RGB values of pixels in the image data into CMYK density values using this color conversion table.

The present invention may also be applied to monochrome image data. In this case, the PC 10 is prestored with a single one-dimensional color conversion table that indicates correlations between gradation values indicating gradations, and density values indicating ink density for one color (K color, for example) which is related to the quantity of ink. The PC 10 calibrates or corrects the density values in the color conversion table dependently on the printing width W so that the density values stored in the color conversion table will grow smaller as the printing width W grows smaller. For example, the PC 10 multiplies all the density values stored in the color conversion table by a predetermined coefficient whose amount grows smaller as the printing width W grows smaller. By converting image data into density data by using the thus calibrated color conversion table, the PC 10 can generate density data so that the black ink density specified by the density data grows smaller as the printing width W grows smaller. Through this process, the printer can be controlled to print monochrome images in quantities of ink suitable for the printing width W.

In the embodiments described above, the printing widths WB of image blocks and the printing width W are found in S402 based on analyses of RGB image data, but these values may be found according to a different method. For example, the printing widths WB for image blocks may be found based on the distance between pixels positioned on each end in the scanning direction of pixels set to ON based on dot data produced from the halftone process, and the printing width W may be set based on these printing widths WB. More specifically, in this modification, the process of S402 is modified as described below.

In S402, first, the CPU 11 executes a color conversion process, similar to S404 in the first embodiment, to convert RGB image data for each pixel into CMYK data by using a predetermined default color conversion table, which is the A4-size color conversion table 17c, for example. Then, the CPU 11 executes a halftone process similar to S416 on the CMYK data to obtain dot data. Based on the thus obtained dot data, the CPU 11 determines the printing widths WB for the respective image blocks, and determines the printing width W as being equal to the shortest printing width WB in the same manner as described above in the first embodiment. This method can set a more precise printing width W.

In the embodiments described above, when image data includes data for a plurality of pages (FIG. 6; S622: YES), the CPU 11 sets the printing width W to the printing width WB for which the print head 39 has the shortest working distance among all dot-forming operations repeatedly performed while printing a plurality of pages worth images. However, setting a common printing width W for all pages in this way may be limited to multi-page printing operations in which the image data includes data for a plurality of pages generated by enlarging image data for a single page. In other words, printing widths W would be set for respective pages individually, in all other printing operations involving a plurality of pages, excluding the multi-page printing operation. This enables the PC 10 to set a suitable printing width W for each page.

The printer driver 17a including the programs executing the process of FIG. 4 (or 7) and 6 may be stored initially in a storage medium, such as a CD-ROM, and be loaded in the HDD 17.

In the embodiments, the PC 10 stores the printer driver 17a, L-size color conversion table 17b, and A4-size color conversion table 17c, and executes the processes of FIG. 4 (or 7) and 6. However, the printer 30 may store the printer driver 17a, L-size color conversion table 17b, and A4-size color conversion table 17c, and execute the processes of FIG. 4 (or 7) and 6.

What is claimed is:

1. A print controller for generating dot data, which specifies a dot formation state and which is to be provided to a printing unit, the printing unit being configured to execute, based on the dot data, dot-forming operations to form dots in dot rows extending in a prescribed direction by moving a print head in the prescribed direction while ejecting ink droplets from nozzles in the print head and to print an image by repeatedly executing the dot-forming operation to form a plurality of dot rows juxtaposed in a direction orthogonal to the prescribed direction, the print controller comprising:

a printing width determining unit that determines a printing width value corresponding to a working distance of the print head in the prescribed direction;

a density data generating unit that generates density data specifying ink densities related to the quantity of ink for each pixel based on image data specifying a gradation value for each pixel and based on the printing width value, the density data generating unit generating the density data so that an upper limit on a tolerable ink density per pixel grows smaller as the working distance of the print head in the prescribed direction corresponding to the printing width value grows shorter; and a dot data generating unit that generates dot data by executing a halftone process on the density data generated by the density data generating unit.

2. A print controller according to claim 1, further comprising a correlation acquiring unit that acquires correlations between the gradation values and the ink densities, which correlations are set based on the printing width value so that the upper limit on the tolerable ink density per pixel grows smaller as the working distance of the print head in the prescribed direction corresponding to the printing width value grows shorter;

wherein the density data generating unit generates the density data based on the image data using the correlations acquired by the correlation acquiring unit.

3. A print controller according to claim 1, wherein the image data specifies gradation values for a plurality of color components;

wherein the density data generating unit includes a color converting unit that references predetermined correlations between gradation values for the plurality of color components and ink densities for a plurality of ink colors to convert the image data to color conversion data specifying the ink densities per pixel for the plurality of ink colors, the ink colors including at least one chromatic ink color; and wherein the print controller further comprises:

a total ink quantity restriction value setting unit that sets a total ink quantity restriction value used in a total ink quantity restricting process for reducing the ink density of chromatic ink color in order to reduce the upper limit on a tolerable value for the sum of ink densities per pixel for all ink colors, the total ink quantity restriction value setting unit setting the total ink quantity restriction value based on the print width value so that the upper limit of the tolerable value for the sum of ink densities per pixel for all ink colors grows smaller as the working distance of the print head in the prescribed direction corresponding to the printing width value grows shorter; and wherein the density data generating unit further includes a total ink quantity restricting unit that generates the density data by executing the total ink quantity restricting process on the color conversion data obtained by the color converting unit using the total ink quantity restriction value set by the total ink quantity restriction value setting unit.

4. A print controller according to claim 1, wherein, in each of the dot-forming operation repeatedly performed to print the image, the print head moves over a working distance corresponding to the length of rows of dots formed in the dot-forming operation with respect to the prescribed direction; and the printing width determining unit sets the printing width value to a value corresponding to a shortest working distance of the print head in the prescribed direction among all dot-forming operations.

5. A print controller according to claim 4, wherein the print head is provided with a plurality of nozzles arranged in a direction intersecting the prescribed direction, and the printing unit forms dots in a plurality of rows in a single dot-forming operation;

the printing width determining unit further includes:

an extracting unit that extracts an image block from the image data, the image block including a group of pixels that correspond to dots formed in a single dot-forming operation and the group of pixels including pixels in a plurality of rows extending in a direction corresponding to the dot rows; and a working distance acquiring unit that analyzes the extracted image block, identifies a color pixel corresponding to a position equivalent to one end of color pixels in the group of pixels with respect to the prescribed direction, and a color pixel corresponding to a position equivalent to the other end of the color pixels in the prescribed direction, and acquires, as a working distance for the dot-forming operation, a value corresponding to a component in the prescribed direction of the distance between the positions corresponding to the identified color pixels, each color pixel having a gradation value indicating that the pixel has color; and the printing width determining unit sets the printing width value based on the working distance acquired by the working distance acquiring unit for each dot-forming operation to be performed when printing the image.

6. A print controller according to claim 1, wherein the printing width determining unit includes:

a print medium position acquiring unit that acquires end positions of a printing medium on which the image is to be printed with respect to the prescribed direction;

an image position acquiring unit that acquires end positions of an image corresponding to the image data with respect to the prescribed direction; and a positional relationship determining unit that determines a positional relationship between the end positions of the printing medium and the end positions of the image corresponding to the image data with respect to the prescribed direction;

wherein the printing width determining unit is configured to be capable of setting the printing width value to a value that is determined based on the width of the printing medium in the prescribed direction when the positional relationship determining unit has determined that at least one of the end positions of the image corresponding to the image data in the prescribed direction is located outside an entire width of the printing medium in the prescribed direction, the entire width of the printing medium being defined by the end positions of the printing medium in the prescribed direction.

7. A print controller according to claim 1, wherein, when the image data includes data for a plurality of pages, the printing width determining unit sets the printing width value to a value corresponding to the shortest working distance of the print head in the prescribed direction among all dot-forming operations to be repeatedly executed when printing a plurality of pages worth of images.

8. A print controller according to claim 1, wherein the working distance is determined based on a distance between end positions of an image corresponding to the image data with respect to the prescribed direction.

9. A print controller according to claim 1, wherein the density data generating unit generates the density data for each pixel, so that the upper limit on the tolerable ink density for each pixel in each dot-forming operation grows smaller as the working distance grows shorter.

10. A method for generating dot data, which specifies a dot formation state and which is to be provided to a printing unit, the printing unit being configured to execute, based on the dot data, dot-forming operations to form dots in dot rows extending in a prescribed direction by moving a print head in the prescribed direction while ejecting ink droplets from nozzles in the print head and to print an image by repeatedly executing the dot-forming operation to form a plurality of dot rows juxtaposed in a direction orthogonal to the prescribed direction, the method comprising:
  determining a printing width value corresponding to a working distance of the print head in the prescribed direction;
  generating density data specifying ink densities related to the quantity of ink for each pixel based on image data specifying a gradation value for each pixel and based on the printing width value so that an upper limit on a tolerable ink density per pixel grows smaller as the working distance of the print head in the prescribed direction corresponding to the printing width value grows shorter; and
  generating dot data by executing a halftone process on the density data.

11. A method according to claim 10, further comprising acquiring correlations between the gradation values and the ink densities, which correlations are set based on the printing width value so that the upper limit on the tolerable ink density per pixel grows smaller as the working distance of the print head in the prescribed direction corresponding to the printing width value grows shorter;
  wherein the density data is generated based on the image data using the acquired correlations.

12. A method according to claim 10,
  wherein the image data specifies gradation values for a plurality of color components;
  wherein the generating the density data includes referencing predetermined correlations between gradation values for the plurality of color components and ink densities for a plurality of ink colors to convert the image data to color conversion data specifying the ink densities per pixel for the plurality of ink colors, the ink colors including at least one chromatic ink color; and
  wherein the method further comprises:
    setting a total ink quantity restriction value used in a total ink quantity restricting process for reducing the ink density of chromatic ink color in order to reduce the upper limit on a tolerable value for the sum of ink densities per pixel for all ink colors, the total ink quantity restriction value being set based on the print width value so that the upper limit of the tolerable value for the sum of ink densities per pixel for all ink colors grows smaller as the working distance of the print head in the prescribed direction corresponding to the printing width value grows shorter; and
    wherein the generating the density data generates the density data by executing the total ink quantity restricting process on the color conversion data using the total ink quantity restriction value.

13. A method according to claim 10, wherein, in each of the dot-forming operation repeatedly performed to print the image, the print head moves over a working distance corresponding to the length of rows of dots formed in the dot-forming operation with respect to the prescribed direction; and
  the determining the printing width value sets the printing width value to a value corresponding to a shortest working distance of the print head in the prescribed direction among all dot-forming operations.

14. A method according to claim 13, wherein the print head is provided with a plurality of nozzles arranged in a direction intersecting the prescribed direction, and the printing unit forms dots in a plurality of rows in a single dot-forming operation;
  the determining the printing width value further includes:
    extracting an image block from the image data, the image block including a group of pixels that correspond to dots formed in a single dot-forming operation and the group of pixels including pixels in a plurality of rows extending in a direction corresponding to the dot rows; and
    analyzing the extracted image block, identifying a color pixel corresponding to a position equivalent to one end of color pixels in the group of pixels with respect to the prescribed direction, and a color pixel corresponding to a position equivalent to the other end of the color pixels in the prescribed direction, and acquiring, as a working distance for the dot-forming operation, a value corresponding to a component in the prescribed direction of the distance between the positions corresponding to the identified color pixels, each color pixel having a gradation value indicating that the pixel has color; and
  the determining the printing width value sets the printing width value based on the working distance acquired for each dot-forming operation to be performed when printing the image.

15. A method according to claim 10, wherein the determining the printing width value includes:
  acquiring end positions of a printing medium on which the image is to be printed with respect to the prescribed direction;
  acquiring end positions of an image corresponding to the image data with respect to the prescribed direction; and
  determining a positional relationship between the end positions of the printing medium and the end positions of the image corresponding to the image data with respect to the prescribed direction;
  wherein the determining the printing width value sets the printing width value to a value that is determined based on the width of the printing medium in the prescribed direction when it is determined that at least one of the end positions of the image corresponding to the image data in the prescribed direction is located outside an entire width of the printing medium in the prescribed direction, the entire width of the printing medium being defined by the end positions of the printing medium in the prescribed direction.

16. A method according to claim 10, wherein, when the image data includes data for a plurality of pages, the determining the printing width value sets the printing width value to a value corresponding to the shortest working distance of the print head in the prescribed direction among all dot-forming operations to be repeatedly executed when printing a plurality of pages worth of images.

17. A method according to claim 10, wherein the working distance is determined based on a distance between end positions of an image corresponding to the image data with respect to the prescribed direction.

18. A method according to claim 10, wherein the density data is generated for each pixel, so that the upper limit on the tolerable ink density for each pixel in each dot-forming operation grows smaller as the working distance grows shorter.

19. A computer readable storage medium storing a set of program instructions for generating dot data, which specifies a dot formation state and which is to be provided to a printing unit, the printing unit being configured to execute, based on the dot data, dot-forming operations to form dots in dot rows extending in a prescribed direction by moving a print head in the prescribed direction while ejecting ink droplets from nozzles in the print head and to print an image by repeatedly executing the dot-forming operation to form a plurality of dot rows juxtaposed in a direction orthogonal to the prescribed direction, the instructions comprising:

determining a printing width value corresponding to a working distance of the print head in the prescribed direction;

generating density data specifying ink densities related to the quantity of ink for each pixel based on image data specifying a gradation value for each pixel and based on the printing width value so that an upper limit on a tolerable ink density per pixel grows smaller as the working distance of the print head in the prescribed direction corresponding to the printing width value grows shorter; and generating dot data by executing a halftone process on the density data.

20. A computer readable storage medium according to claim 19, wherein the working distance is determined based on a distance between end positions of an image corresponding to the image data with respect to the prescribed direction.

21. A computer readable storage medium according to claim 19, wherein the density data is generated for each pixel, so that the upper limit on the tolerable ink density for each pixel in each dot-forming operation grows smaller as the working distance grows shorter.

* * * * *